Nov. 20, 1928.
R. R. ROTH
1,692,577
EMERGENCY REPAIR LINK
Filed Jan. 6, 1927
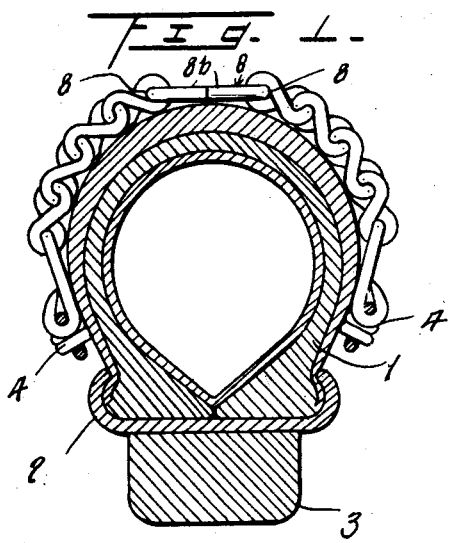
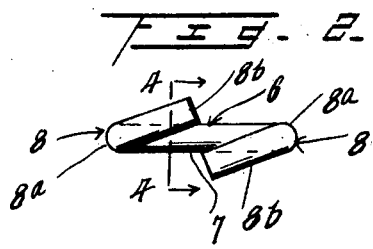
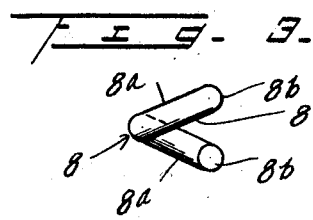
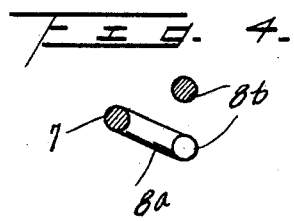
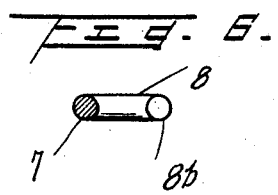
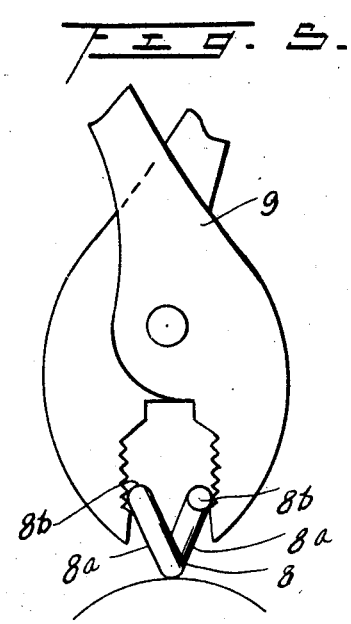
Inventor
R. R. Roth.
By
Attorney Patented Nov. 20, 1928.

1,692,577

UNITED STATES PATENT OFFICE.

ROBERT R. ROTH, OF THOMAS, WEST VIRGINIA.

EMERGENCY REPAIR LINK.

Application filed January 6, 1927. Serial No. 159,416.

This invention relates to improvements in emergency repair links of that type used for the purpose of rejoining the ends of broken cross chains of anti-skid tire chains, and more particularly to improvements in that link of this type that comprises a body and open loops located at the ends of the body and having their free end portions extending inwardly beyond each other and arranged in parallel relation to each other and to the body. When the loops of this link are closed, the free end portions thereof occupy angular positions with respect to the body, the free terminals of the free end portions are positioned in the loops, and one of the free end portions occupies an angular position with respect to the tread of the tire and with its free terminal next to the tread. While this link has been used in connection with anti-skid chains on high pressure tires without puncturing the same, it is not adapted for use in connection with anti-skid chains on low pressure tires for the reason that the free terminal of that free end portion occupying an angular position with respect to the tread of the tire would be forced in comparatively short time through the casing and inner tube of the tire.

The present invention has for one of its objects to improve this link to the end that it may be used on low pressure tires without danger of puncturing the same and to the end that it may be more readily closed, and to attain these ends comprehend the shortening of the free end portions of the loops and the arrangements of such portions in a manner with respect to each other and to the body as to cause them, when the loops are closed, to occupy a common plane substantially parallel to the body and to the tread of the tire.

With the foregoing and other objects in view, the nature of which will become apparent as the description proceeds, the invention consists of the novel combination and arrangement of parts hereinafter fully described and claimed, and illustrated in the accompanying drawing, wherein:

Figure 1 is a sectional view taken on a plane extending transversely through a pneumatic tire and anti-skid chain of which the latter is shown as having a cross chain repaired by means of my improved repair link, Figure 2 is a detail view of the link looking at one side edge thereof, Figure 3 is a similar view of the link looking at one end edge thereof, Figure 4 is a sectional view taken on the plane indicated by the line 4—4 of Figure 2, Figure 5 is a view illustrating the manner in which the loops of the link are closed, and Figure 6 is a sectional view taken on a plane extending transversely through the closed link.

Referring to the drawing by reference characters, 1 designates a pneumatic tire which is shown applied to the rim 2 of a wheel 3 and which is shown equipped with an anti-skid chain comprising side chains 4 and cross chains of which only one is shown. The cross chain 5 is illustrated as having been broken and the broken ends thereof rejoined by my improved link.

The link 6 is made from a single piece of round wire stock of hard carbon steel, and comprises a straight body 7 and loops 8. The loops 8 are located at the ends of the body 7 and embody arcuate portions $8^a$ and straight free end portions $8^b$. The end portions $8^b$ extend inwardly, and are slightly shorter than one-half the length of the body 7. The end portions $8^b$ together with the arcuate portions $8^a$ are arranged at an angle to the body 7 and parallel to each other.

As the arcuate and straight end portions of the respective loops 8 are arranged in parallel planes located at an angle to the body 7, the link may be readily engaged with the broken ends of the cross chain and then closed without removing the anti-skid chain from the tire. The link may be closed by a tool such as the pliers 9 shown in the drawing or by pressure exerted on the end portions $8^b$ during rotation of the wheel on which the chain is mounted and during this operation the end portions $8^b$ of the loops are moved in the direction of each other. When the link is closed the end portions $8^b$ about one another and occupy a common plane and are arranged in parallel relation to the body 7 and in substantially parallel relation to the tread of the tire. As the end portions $8^b$ occupy a common plane, there is no possibility of either of the end portions being forced into the tire, and owing thereto the link is adapted for use in connection with anti-skid chains applied to either low pressure or high pressure tires with all liability of the puncturing of the tires obviated. Furthermore, the relative arrangement of the loops 8, their arrangement with respect to the body 7, and the fact that the end portions 8$^b$ are shorter than one-half the length of the body, permits the link to be readily closed.

What is claimed is:—

A link of the character described, comprising a body having loops extending from the opposite ends thereof, said loops being in planes at other than right angles to one another and having ends the prolongation of which overlie one another when the link is open, said ends being in abutment when the link is closed.

In testimony whereof I affix my signature.

ROBERT R. ROTH.